Patented Jan. 2, 1923.

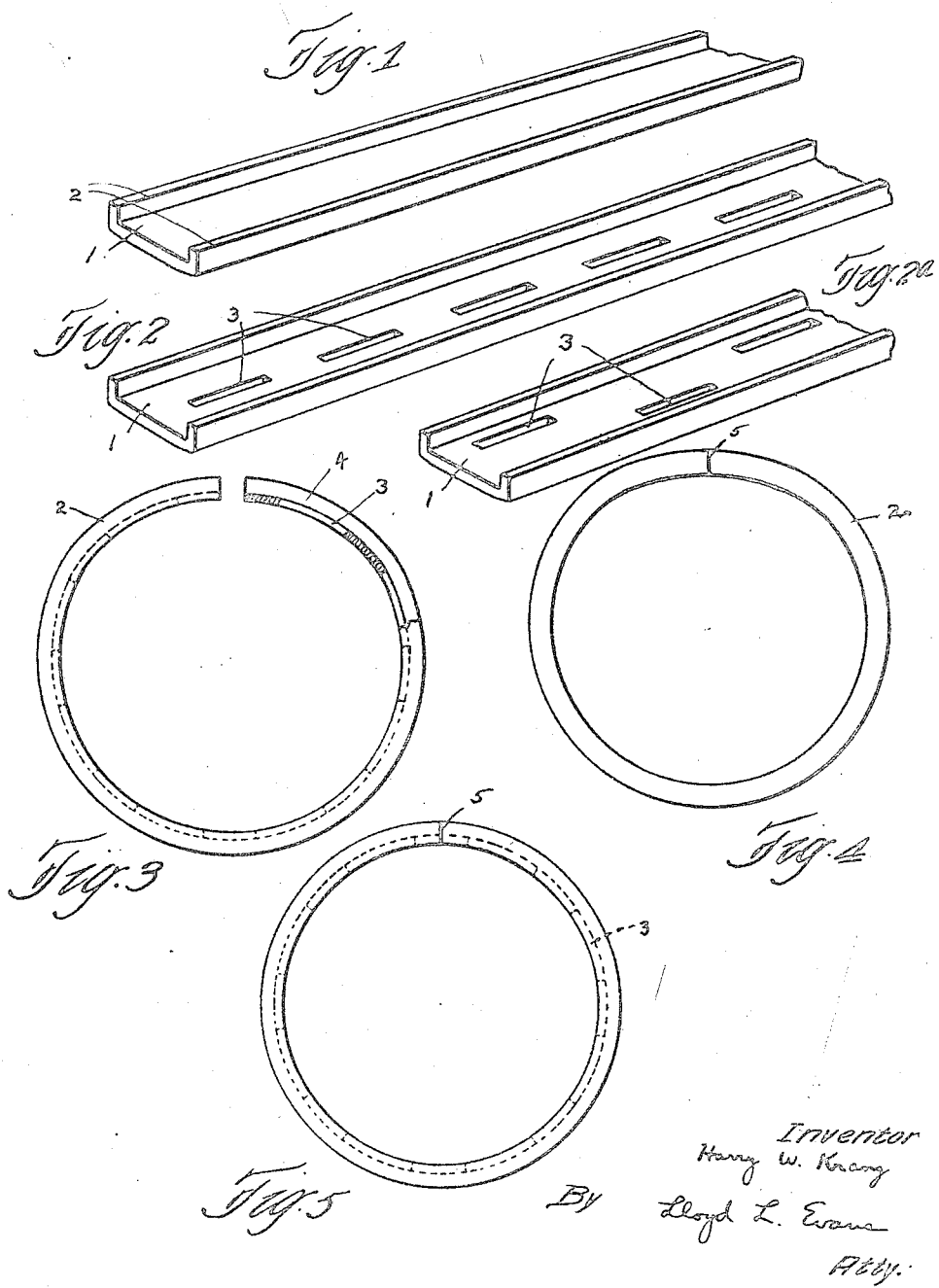

1,441,004

UNITED STATES PATENT OFFICE.

HARRY WM. KRANZ, OF CLEVELAND, OHIO, ASSIGNOR TO THE HYDRAULIC STEEL COMPANY, OF CLEVELAND, OHIO, A CORPORATION OF OHIO.

TIRE BASE AND METHOD OF MAKING SAME.

Application filed November 18, 1921. Serial No. 516,205.

*To all whom it may concern:*

Be it known that I, HARRY W. KRANZ, a citizen of the United States, residing at Cleveland, in the county of Cuyahoga and State of Ohio, have invented a certain new and useful Improvement in Tire Bases and Methods of Making Same, of which the following is a full, clear, and exact description, reference being had to the accompanying drawings.

This invention relates to metallic bases for holding rubber tires or other traction elements.

An object of this invention is to produce a metallic base for holding solid or cushion tires in which the base can be easily stretched to the appropriate size and contour without weakening or injuring the welded portion. It is well known that in stretching or sizing these bases a few of them are fractured at the weld, due to faulty welding. There are also some which are dangerously strained at the weld, due to stretching it nearly to its limit, without its being possible by inspection to detect this strained condition. Such bases do not show their weakening until they subsequently give way in the process of applying them to a wheel after they have received a rubber tire, or in actual service, and in either event the giving way of the weld is a matter liable to cause serious injury to persons, as well as to cause destruction of property. The possibility of such accidents can be greatly reduced by reducing the cross-sectional area of the base at a plurality of places before it is sized. This permits the base to elongate slightly at the places where the cross sectional area has been reduced and lessens the strain on the weld. But when the cross-sectional area of the base is uniform throughout, the welded portion is the weakest part and all strains put upon the base in stretching and sizing it are transmitted to the weld and in a few cases are in excess of the strength of the weld.

Another object of the invention is to slot the strips from which the base is formed before they are rolled into a hoop and welded, as it has been found that it is easier and more economical so to do.

A further object of the invention is to produce a base which is adapted for the application of solid tires in which one or more air passages may be formed.

A further object of the invention is to produce a metallic base member which may be used as a base for holding pneumatic tires.

A further object of this invention is to produce such a base in an economical and efficient manner.

In the drawings forming a part of this specification,

Figure 1 is a perspective view showing a metallic strip.

Figs. 2 and 2A are perspectives showing the strip after it has been perforated.

Fig. 3 shows the strip after it has been rolled.

Fig. 4 shows the strip after it has been welded, and

Fig. 5 shows the base after it has been sized.

In the ordinary manufacture of solid tire bases, a flat strip or channel 1 with the usual tire retaining flanges 2 rolled at the steel mill is the raw material received at the rim and base plant, and my invention contemplates using either such strips or strips formed in any manner with tire retaining flanges. One of the strips 1 is first perforated by passing it thru any suitable perforating press (not shown) while it is flat, to form the relatively long narrow slots 3 which reduce the cross-sectional area of the strip in portions symmetrically. These slots may be placed in the rim in any suitable manner. Fig. 2 showing them in the base so arranged that this base can be used to receive a solid tire and mold therein a continuous annular air cushion by the insertion of cores thru the slots, as is well known in the art. In Fig. 2A the slots are shown staggered and even in this form a plurality of air passages may be formed in the resultant tire, if desired, by the insertion of such cores. The base, however, will function equally well with a solid tire not having air cushions molded therein.

While I have mentioned the forming of slots as a method of reducing the cross-sectional area of portions of the base, it is to be understood as within the scope of this invention to reduce in any other way the cross-sectional area of portions.

The strip is then rolled in the ordinary rolling machine with offset rolls (not shown) to form the hoop 4 and the hoop is welded at 5 in a suitable butt-welding machine. The hoop or base is then sized by stretching in a bull-dozing machine and is also given a round contour circumferentially (see Fig. 5) in this operation. The portions of the base previously reduced in cross-sectional area permit the base to elongate and if these portions are arranged symmetrically the elongation takes place uniformly thruout their length. Thus the sizing machine does not strain the weld as heretofore was customary when the base was left solid or had a uniform cross-sectional area thruout, for less pull is necessary to enlarge the base circumferentially when it is thus weakened.

Prior to the adoption of the slotted base, a certain percentage of bases were fractured at the weld by the sizing operation, since the weld is the weakest portion. Other bases were seriously damaged at the welded portions by the severe strains which were near the limit of the strength of the weld, yet they could not be detected by close inspection. It has been proven by experience that the welds produced in ordinary manufacture are sufficiently strong to withstand without damage the strain necessary to circumferentially size bases made according to my invention.

As it is usual to stretch bases only slightly in circumference, and as the slots should preferably be of the same size and arranged symmetrically around the base, the metal will be practically uniformly thinned at the reduced portions around the circumference of the base and only to a very small extent, for the slight elongation in the average bases does not materially weaken it.

The presence of slots in the circumference of the rim is not detrimental as they are protected by the solid tire on one side and tightly engage the felly of a wheel on the other side, so that there is no chance of dirt, water, or other foreign matter collecting in the slots or having access to the rubber.

After the base is sized and made round, the bottom may be prepared by machining dove-tailed grooves, or grooves of any kind, (not shown) to anchor the rubber of a solid tire subsequently to be applied.

Having described my invention, what I claim is:

1. The method of forming bases which consists in sizing an endless welded metallic hoop having portions reduced in cross sectional area.

2. The method of forming bases which consists in stretching and shaping an endless welded hoop having portions reduced in cross sectional area.

3. The method of forming tire bases which consists in reducing the cross sectional area of portions of a blank of suitable cross-sectional contour, rolling the blank, welding the ends and stretching to the proper size and circumferential contour.

4. The method of forming bases which consists in circumferentially elongating an endless welded perforated base.

5. The method of forming tire bases which consists in perforating a strip of metal, rolling the strip, and welding the ends.

6. The method of forming tire bases which consists in reducing the cross-sectional area of portions of the base at any time before the sizing operation, rolling the base and welding the ends thereof, then sizing by stretching the base to the proper size and contour.

7. The method of forming tire bases which consists in reducing the cross-sectional area of successive portions of the base symmetrically, rolling, welding the ends together and stretching to the proper size.

8. As an article of manufacture an endless welded annular channel to receive a rubber tire, said channel having weakened cross sectional areas to permit stretching to the proper size and contour.

9. As an article of manufacture an endless welded annular metallic channel to receive a rubber tire, said channel having portions reduced in cross sectional area to permit stretching and shaping to the proper size and circumferential contour respectively.

10. A welded annular metallic base or band having portions of the cross-sectional area weakened symmetrically to permit shaping to the proper size and contour.

In testimony whereof, I hereunto affix my signature.

HARRY WM. KRANZ.